July 1, 1969   H. MEINUNGER   3,453,011
SUPPORT PARTICULARLY FOR PHOTOGRAPHIC PURPOSES
Filed Aug. 2, 1967

INVENTOR
HELLMUT MEINUNGER
BY *John J. Gallagher*
ATTORNEY

United States Patent Office 3,453,011
Patented July 1, 1969

3,453,011
SUPPORT PARTICULARLY FOR PHOTOGRAPHIC PURPOSES
Hellmut Meinunger, Radevormwald, Germany, assignor to Kurbi and Niggeloh, Radevormwald, Germany
Filed Aug. 2, 1967, Ser. No. 657,810
Claims priority, application Germany, Aug. 2, 1966, K 55,161
Int. Cl. F16b 7/18; F16m 11/00
U.S. Cl. 287—58                                    10 Claims

ABSTRACT OF THE DISCLOSURE

An adjustable support having telescopable leg segments of open cross-sectional profile. In profile, the segments comprise a web having side members extending substantially normal to the plane thereof in coextensive relationship with one another, with the free edges thereof deformed inwardly toward one another and terminating in an extension toward the web. Succeeding segments of the leg fit within one another and a thumb screw provided in the web of one of the segments provides clamping pressure between the webs of successive segments to fix sliding and telescoping relationship therebetween.

Background of the invention

This invention relates generally to supports and more specifically to a novel profile configuration for segments of telescopable leg for such supports.

Although the invention will be described hereinafter as specifically applied to tripods, it should be understood that the precepts thereof are equally applicable to any adjustable support structure.

Adjustable tripod supports are common in the prior art and find many uses such, for example, as for camera and light supports in the field of photography. In the prior art, a common inexpensive form of the segments making up the telescoping legs has been that having an open cross-sectional profile. Such adjustable tripods generally are provided with telescoping leg structures by which the height or orientation of the device supported by the tripod may be adjusted by suitable manipulation of the legs to shorten or lengthen them as needed. Means, generally comprising screw clamps of various types, are provided to fix the telescopic relationship of the segments making up the legs at desired points.

In the prior art open profile type of structure, the cross-sectional configuration has been generally such that the transverse web member has been provided with side members which project inwardly toward one another in a wedge shaped manner with successive segments telescoping within one another. In conventional arrangements wherein a thumb screw, threadably mounted through the web of a first or outer leg segment, fixes sliding relationship between the leg segments by compression against the web of a succeeding or inner segment, the outer surfaces of the wedge-like inwardly converging sides of the inner leg segment are urged, by pressure exerted therethrough by the thumb screw, against the inner surfaces of the side members of the outer leg segment thereby tending to bend the side members of that segment outwardly. Such bending or deformation of the outer leg segment limits the contact pressure for locking action unless some external force is exerted upon the side members of that leg segment to counter the locking force. Because of this, the conventional structure of this type is provided with a connecting piece encircling the outer leg segment, at least in the zone of clamping engagement. Such connecting pieces interfere with the smooth configuration of the legs, increase the resultant weight of the tripod and cause additional expense in fabrication and material.

Summary of the invention

This invention avoids the disadvantages of the prior art by providing a telescoping, open profile leg segment structure for supports in which the free ends of the side walls of the respective leg segments are formed in such a manner that the lateral forces tending to deform prior art structures are eliminated. This is accomplished by forming the portion of the side walls of the legs, near the free edges thereof, in such a manner that they extend ultimately toward the plane of the web of the segment. The free edges of the side members are preferably bent to converge and ultimately extend toward the web so that the force exerted by clamping action between segments is symmetrically received.

In a particularly advantageous embodiment of the invention, the side walls adjoining the web extend substantially perpendicular to the web in parallel coextensive relationship to one another and are provided with an inwardly converging portion bent at an angle with the side wall and terminate in a terminal portion bent at an angle with respect to the inwardly converging portion in such a manner as to thereby form a laterally symmetrical trough open to the web. Since the lateral outward bending forces are substantially cancelled by the symmetrical resistance thereto, the requirement of a solid connecting piece at the point of clamping is eliminated.

The segments of the telescopic legs are preferably fixed with respect to one another by clamping action exerted by a thumb screw threadably received through the web of the preceding segment to engage the web of the succeeding segment contained therein.

Other advantages and objects of this invention will become more apparent to those skilled in the art by reference to the following detailed description when viewed in light of the accompanying drawing wherein like numerals throughout the figures thereof indicate like components and wherein:

Description of the preferred embodiment

Figure 1:
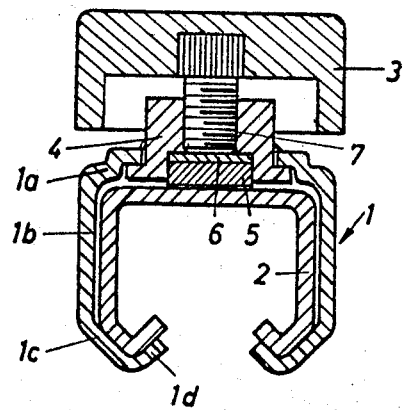
FIGURE 1 is a transverse sectional view through a pair of succeeding segments of a leg in accordance with the invention.
Figure 2:
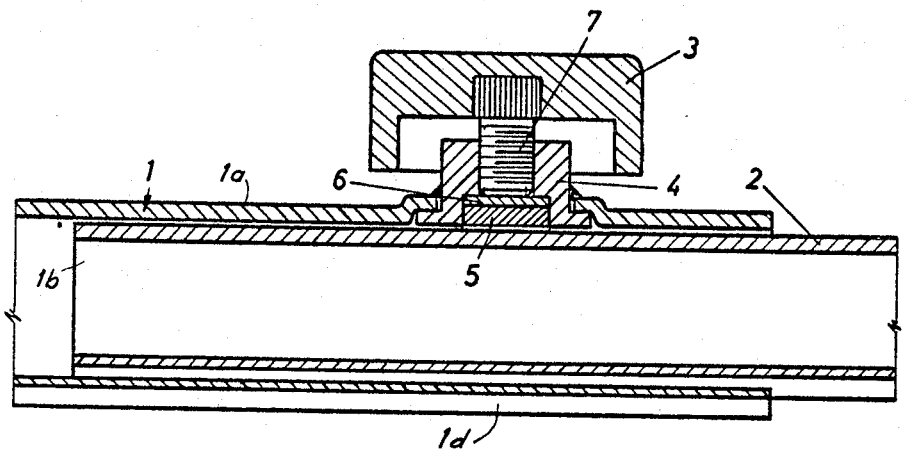
FIGURE 2 is a view, in longitudinal section, of the device of FIGURE 1.

Referring now to the figures, a first leg segment, shown generally at 1, and hereinafter referred to as the preceding segment, encompasses therein a second leg segment 2, hereinafter referred to as the succeeding segment. Since the components making up the cross-sectional configuration of both the leg segments 1 and 2 are substantially identical in form, the components of the leg segment 1 will be specifically described hereinbelow, however, it should be understood that the corresponding components of the leg segment 2 possess the same properties and general configuration as those specifically described for the leg segment 1.

The segment 1 is provided with a web 1a which has, extending from the plane thereof, side members 1b. The side members 1b are provided with portions 1c which inwardly converge toward one another at an angle to the side members 1b. Terminal portions 1d extend from the plane of the inwardly converging portions 1c toward the web 1a to form a symmetrical trough, open toward the web.

In a preferred embodiment, the portions 1c make an angle of approximately 45° with respect to the side members 1b, and the terminal portions 1d are disposed at approximately 90° with respect to the portions 1e.

The length of the portion 1d is preferably approximately ½ the length of the portion 1c while the portion 1c is, in length, approximately ½ that of the wall member 1b.

As can be seen in FIGURE 1, the succeeding leg segment 2 is configured to conform to the structure of the preceding leg segment 1, except that the relative dimensions of the segment 2 are sufficiently smaller than those of segment 1 to provide sliding, telescopic receipt of the segment 2 within the segment 1. The leg segment 1 is further provided with threaded housing 4 which is fitted in a dimple in the web 1a and is fixed thereto by means of a weld or like connection. The housing 4 threadably receives a threaded shaft 7 of a thumb screw 3 therein. A disc 6 is disposed adjacent the end of the shaft 7 and bears against a friction increasing contact piece 5 on the other side thereof.

In operation, with the preceding leg segment 1 and succeeding leg segment 2 suitably telescoped with respect to one another, the telescoping motion therebetween is fixed by rotation of the thumb screw 3 to impose friction between the contact member 5 and the web of the leg segment 2 by means of pressure exerted by longitudinal movement of the shaft 7 against the disc 6.

As can be readily seen by reference to FIGURE 1, pressure is transmitted through the web of the leg segment 2 through the wall members normal thereto and the inwardly converging and terminal portions at the edge thereof to be transmitted to the corresponding inwardly coverging and terminal portions 1c and 1d of the leg segment 1. The reaction force resulting in these members will have, with reference to FIGURE 1, vertical and lateral components, the vertical component being transmitted by the wall member 1b to the web 1a while the lateral components will be substantially cancelled out, due to the substantially symmetrical lateral configuration and angular orientation of the portions 1c and 1d.

By cancellation of the lateral components as described above, lateral force is not transmitted to the wall members 1b thereby eliminating outward distortion of the wall members and the attendant requirement for connecting pieces encompassing the leg segment 1 at the points of clamping.

What has been set forth above is intended primarily as exemplary to enable those skilled in the art in the practice of the invention. It should therefore be understood that, within the scope of the appended claims, the invention may be practiced other than as specifically described.

What is claimed is:

1. An adjustable support having leg structures of open profile including succeeding segments telescopically received in one another, said segments comprising in cross section:
    a web;
    a pair of spaced parallel side members extending substantially normal from the plane of said web in coextensive relationship to one another;
    the free edges of said side members being formed with a portion thereof converging inwardly toward one another and a terminal portion extending toward said web member so as to form a pair of V-shaped troughs open toward the web; the sides of each trough forming equal angles with a plane extending through the apex of the trough and parallel to the side members so as to insure that any force exerted by clamping action between the segments and parallel to said planes is symmetrically received with the lateral components thereof being canceled out.

2. A support in accordance with claim 1 wherein said side members have the inwardly converging portion thereof forming an angle of approximately 45° therewith and said terminal portion thereof forming an angle of 90° with respect to the inwardly converging portion.

3. A support in accordance with claim 2 wherein the length of the inwardly converging portion is approximately ½ of the length of said side member and the length of said terminal portion is substantially ½ that of the inwardly converging portion.

4. A support in accordance with claim 1 wherein the succeeding segments of said leg structure are reduced in size such that the corresponding components thereof are substantially in slidable contact with one another, clamping means mounted on the web of one of said segments and engageable with the web of the succeeding segment thereto to fix movement between the segments by application of pressure between said webs in a direction normal to the planes thereof.

5. A support in accordance with claim 4 wherein said clamping means comprises a thumb screw threadably received through the web of a first segment to be engageable by rotation thereof with the web of the succeeding segment thereto.

6. A support in accordance with claim 2 wherein the succeeding segments of said leg structure are reduced in size such that the corresponding components thereof are substantially in slidable contact with one another, clamping means mounted on the web of one of said segments and engageable with the web of the succeeding segment thereto to fix movement between the segments by application of pressure between said webs in a direction normal to the planes thereof.

7. A support in accordance with claim 3 wherein the succeeding segments of said leg structure are reduced in size such that the corresponding components thereof are substantially in slidable contact with one another, clamping means mounted on the web of one of said segments and engageable with the web of the succeeding segment thereto to fix movement between the segments by application of pressure between said webs in a direction normal to the planes thereof.

8. A support in accordance with claim 6 wherein said clamping means comprises a thumb screw threadably received through the web of a first segment to be engageable by rotation thereof with the web of the succeeding segment thereto.

9. A support in accordance with claim 7 wherein said clamping means comprises a thumb screw threadably received through the web of a first segment to be engageable by rotation thereof with the web of the succeeding segment thereto.

10. A support in accordance with claim 6 wherein said clamping means comprises a thumb screw threadably received through the web of a first segment to be engageable by rotation thereof with the web of the succeeding segment thereto.

References Cited
UNITED STATES PATENTS

| | | | |
|---|---|---|---|
| 1,309,375 | 7/1919 | Taylor | 248—414 X |
| 2,201,043 | 5/1940 | Kirsch | 248—262 X |
| 2,842,387 | 7/1958 | Della-Porta | 248—413 X |
| 2,927,762 | 3/1960 | Owsiak | 248—262 |

CARL W. TOMLIN, Primary Examiner.

A. V. KUNDRAT, Assistant Examiner.

U.S. Cl. X.R.

248—413; 287—103